March 12, 1963 W. R. WOLFE, JR 3,081,204
PRIMARY CELLS
Filed Aug. 11, 1960
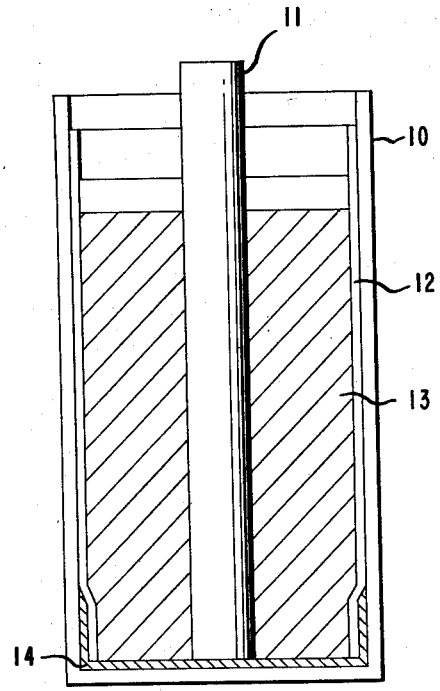
INVENTOR
WILLIAM R. WOLFE, JR.
BY  C. Harold Herr
ATTORNEY

United States Patent Office 3,081,204
Patented Mar. 12, 1963

3,081,204
PRIMARY CELLS
William R. Wolfe, Jr., Wilmington, Del., assignor to E. I. du Pont de Nemours and Company, Wilmington, Del., a corporation of Delaware
Filed Aug. 11, 1960, Ser. No. 49,067
7 Claims. (Cl. 136—137)

This invention relates to, and has as its principal object provision of, novel primary voltaic cells containing as a cathode depolarizer a polycyano compound containing at least one ethylenic group.

It has now been unexpectedly discovered that certain ethylenically unsaturated compounds, characterized by the fact that they contain at least two cyano groups directly attached to the same or different ethylenic carbon atoms, are effective depolarizers in conventional primary voltaic cells containing the usual aqueous inorganic salt electrolytes and cathodic and anodic materials. These polycyanoethylenic compounds are further characterized by being stable in the presence of aqueous inorganic salt electrolytes by having molecular weights preferably below about 400, by having at least one pair of ethylenic carbon atoms per molecule, and preferably by having a limited solubility in water.

These compounds, when incorporated into primary voltaic cells during their usual manufacturing processes, exhibit a capacity to suppress the well-known undesirable cathode polarization; hence, their classification as cathode depolarizers.

Further aid in understanding the invention will be obtained from the drawing which represents schematically a section of a dry-cell battery based on the principles of the present invention. The battery is constructed of a magnesium cup 10 which serves as the anode while carbon is used as the other electrode 11. An insulator 14 prevents contact between these two electrodes. The cathode mix 13 contains a polycyanoethylenic compound, a conductor such as graphite, and an electrolyte such as a magnesium halide. A separator 12 of porous permeable material is between the anode and the cathode mix. The whole cell can be optionally enclosed by steel or other inert container.

The "cathode" is the positive electrode to which electrons flow from the external circuit. Chemically, cathode materials or "cathode depolarizers" are oxidizing substances characterized by accepting with ease electrons from the external circuit to give a reduced form (i.e., to a lower oxidation state) of the substance as a result of the electrochemical reactions involved. Cathode materials or depolarizers are in general nonconductors or semiconductors of electricity and the electrons from the external circuit must be distributed to the depolarizer. This distribution is accomplished in primary cells by mixing the depolarizer with an inert electrical conductor, such as carbon having high surface area. Electrolyte is added to permit ion transfer between the anode and cathode and the mixture of depolarizer, inert conductor and electrolyte is referred to as the "cathode mix."

By the term "primary voltaic cell" is meant the class of cells which converts stored chemical enery into electrical energy by electrochemical reactions which are not conveniently reversible. Types of cells included are dry cells, wet cells, reserve cells, and fuel cells.

By the phrase "stable in the presence of aqueous inorganic salt electrolytes" is meant that no chemical reaction takes place when admixed with aqueous inorganic salt in the absence of electrical current. Inorganic salt electrolytes are readily available and generally are groups I and II halides, hydroxides, sulfates, nitrates, etc., which have good solubility in water. Preferred concentrations of electrolytes in water are of the order 50 to 500 grams per liter of water.

By the term "aqueous" is meant that the primary voltaic cells will contain, in addition to the inorganic salt electrolytes, sufficient water to permit ions to be formed and to travel from cathode to anode or vice versa. Sometimes very small amounts of water are needed, so that the inorganic salt electrolytes are present as a more or less paste-like mixture. At other times, the electrolytes may actually be sufficiently diluted with water so that a true (liquid) solution exists. Thus, the amount of water present in any given cell can have a wide range, e.g., between 0.05 to 99.5 weight percent of total electrolytic material in most cases. The exact amount of water present in any given battery will, of course, be determined by a number of different variables, of all of which the art is well aware.

By the term "inorganic salt electrolytes" reference is had to the conventional materials used with water to permit ionic conduction between the anode and cathode of a voltaic cell. A number of different electrolytic materials are known to the art and in the sense that they all have utility as ionic conductors they are more or less equivalent to one another, although to those skilled in the art, the choice of a particular material depends upon the individual battery being constructed. Typical well-known electrolytic materials are described, for example, in the article entitled "Batteries" by Moorehouse, et al., in volume 46 of the Proceedings of the IRE, pages 1462–83 (1958).

For dry cells and the less important wet cells, the cathode depolarizer should be practically insoluble in water, having a solubility of generally less than 1% in water. More soluble materials are less preferred in dry cell use since their shelf life is short. On the other hand for reserve cells, more soluble depolarizers (i.e., those having a solubility in water of at least 1% and up to 20% or more) are useful since they are stored separate from aqueous electrolyte and used only once after activation, i.e., introduction into the cell.

While the polycyanoethylenic compounds used in this invention will usually have molecular weights of not greater than 400, it must be understood that certain higher molecular weight materials having cyano groups bound to ethylenic carbon atoms as described have value as cathode depolarizers and are within the spirit and intent of this invention. However, those compounds having molecular weights of below 200 are preferred. Polycyanoethylenic compounds will usually have molecular weights greater than about 100. Also these compounds usually have less than 8 cyano groups per molecule and less than 4 ethylenic groups per molecule.

The most useful and active compounds have four negative substituents, i.e., $R_1$, $R_2$, $R_3$, and $R_4$ are all negative (or electron attractive groups). A particularly useful and valuable class of polycyanoethylenic compounds for use in the present invention can be represented by the formula (1) 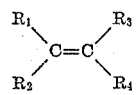

wherein at least two of the R groups are cyano and at least one of the remaining R groups is a negative substituent (e.g., halogen, cyano, hydroxyl, alkoxyl, cyano-substituted hydrocarbyl, sulfonyl, and the like).

More particularly, in Formula 1 $R_1$ is cyano, $R_2$ is selected from the group consisting of cyano, sulfonyl, and halogen, $R_3$ is selected from the group consisting of cyano and sulfonyl, and $R_4$ is selected from the group consisting of cyano, hydrogen, halogen, hydroxyl, alkoxyl, amino and hydrocarbyl including substituted hydrocarbyl such as cyano-substituted hydrocarbyl. In the above, halogen is preferably chlorine and alkoxyl of up to four carbons and hydrocarbyl is up to 12 carbons. $R_3$ and $R_4$ in the above formula can be joined to form a cyclic structure as in α-dicyanomethylene fluorene.

Useful polycyanoethylenic compounds for the purpose of this invention include tetracyanoethylene,
tricyanoethylene,
tricyanovinyl chloride,
tricyanovinyl alcohol,
1,1,2,3,3-pentacyanopropene,
1,1,2,4,5,5-hexacyano-3-azapentadiene,
2-dicyanomethylene-1,1,3,3-tetracyanopropane,
2-ethoxy-1,1,3,3-tetracyanopropene,
2-amino-1,1,3,3-tetracyanopropene,
tricyanovinyl-n-butylamine,
phenyl tricyanoethylene,
1,1,3-tricyano-2-aminopropene,
1,4-bis(dicyanomethylene)-2,5-cyclohexadiene,
1,1-dichloro-2,2-dicyanoethylene,
1,2-dichloro-1,2-dicyanoethylene,
1,2-dicyano-1,2-bis(p-toluenesulfonyl)ethylene,
 (obtained by reaction of dichlorofumaronitrile in dimethylformamide with anhydrous sodium p-tolueneful-finate),
(4-tricyanovinylphenyl)dicyanomethane,
 (obtained by reaction of malononitrile with 1,2-bis(dicyanomethylene)cyclohexadiene, and
1,1,2,4,5,5-hexacyano-2,4-pentadiene
 (from reaction of tricyanovinyl chloride with methyl vinyl ether followed by reaction of the 4-methoxy-1,1,2-tricyano-1,3-butadiene with tricyanovinyl chloride).

Many of the above cyanocarbon compounds are described in J. Am. Chem. Soc. 80, 2775–2844 (1958). Chlorotricyanoethylene (alternately named as tricyanovinyl chloride) has been prepared by the bromination of 1,1,2-tricyanoethane followed by treatment with a tert.-alkylamine to give tricyanoethylene, which is chlorinated and then reacted with a tert.-alkylamine. Chlorotricyanoethylene can also be prepared from tricyanovinyl alcohol. These methods are described in Dickinson U.S. Patent No. 2,942,022, issued June 21, 1960. The 1,4-bis(dicyanomethylene)cyclohexadienes are prepared by reaction of malononitrile with 1,4-cyclohexanedione followed by oxidation of the 1,4-bis(dicyanomethylene)cyclohexane with N-bromosuccinimide or selenium dioxide.

Of the compounds containing the >C=C(CN)$_2$ groups with at least one further negative group attached to ethylenic carbon, those that are most useful contain at least three cyano groups. Preferably they have only cyano groups as negative substituents in the molecule although other inert groups, e.g., chloro, which are stable under the conditions present in the voltaic cell can be present.

The polycyanoethylenic compounds useful in this invention are stable not only in the presence of aqueous electrolytes but also at elevated temperatures. For example, tetracyanoethylene can withstand temperatures approaching 1000° C. before a major amount is decomposed. This fact is a particular advantage for voltaic cells since they may be subjected to storage or use under adverse conditions of heat or radiant energy.

Many of these polycyanoethylenic compounds form salts with amines or metals. These salts can also be used in cells. The salts have greater solubility in electrolytes but generally are deficient in stability in aqueous electrolytes when used for primary cells of long shelf life. However, they are particularly useful for reserve-type cells in which one of the major ingredients (such as electrolyte) is introduced prior to use to activate the cell.

As noted above, the primary cells in which the dicyanoethylenic compound is employed are of conventional design and manufacture except for the use of these novel compounds as cathodic materials or depolarizers. Thus, the cells generally have as the anodic material magnesium, aluminum, or zinc, or alloys of these metals, although it is obvious that other metals can be used. The choice of the specific anode material is dependent upon the cell characteristics desired, e.g., the voltage requirements, as well as availability, etc.

The cells have as the cathodic material the polycyanoethylenic compounds which serve as cathode depolarizers. In practice, one can either coat a conducting electrode of graphite or other inert conductor of a voltaic cell with polycyanoethylenic compound or one can incorporate into an aqueous salt electrolyte adjacent to this electrode a sufficient quantity of the polycyanoethylenic compound to produce the desired depolarization effect. The amount of polycyanoethylenic compound in the cathode mix is generally within the ratio by weight of 1:5 to 5:1 and preferably between 1:1 and 2:1 of ethylenic compound to total of inert conductor and ethylenic compound. The amount of inert conducting material, e.g., graphite, present in the cathode mix is an amount sufficient to enable the mixture to serve as a conductor.

Electrolytes, diaphragms, inert conductors such as of carbon are also useful in the construction of the cells. Additional materials, such as anticorrosive agents, e.g., chromates, inhibitors, etc., can also be present. The use of the ethylenically unsaturated polycyano compounds as depolarizers in cells offers several advantages. The systems are generally stable at elevated temperatures. They provide a higher initial voltage and have a greater capacity than conventional dry cells.

The following examples further illustrate primary voltaic cells containing polycyanoethylenic compounds as an essential component.

Example I

A flat primary cell was constructed as follows: The cathode mix was made from a mixture of 1,4-bis(dicyanomethylene)-2,5-cyclohexadiene and powdered graphite made into a paste by mixing with aqueous silver nitrate as the electrolyte. The cathode mix was pressed onto a platinum metal electrode in order to make electrical contact. The anode mix was made from powdered $AgNO_3$ and graphite made into a paste with the electrolyte and contacted to a silver electrode. The cathode mix was prevented from coming into electrical contact with the anode by the use of a filter paper saturated with electrolyte. The electrolyte was acetonitrile. The cell delivered 3 ma. into a 25-ohm load.

Example II

A cell based on tetracyanoethylene-aqueous $MgBr_2$—Mg was assembled. The anode was a magnesium metal plate (99+% pure), whereas the cathode mix was 0.5 g. of tetracyanoethylene mixed with 0.05 g. of acetylene carbon black which was sandwiched between paste layers made of 100-mesh graphite and the electrolyte. The electrolyte was aqueous $MgBr_2$ (500 g./liter of $MgBr_2 \cdot 6H_2O$) and filter paper served as the separator. The open circuit voltage, as measured with a voltmeter, was found to be 1.9–2.0 volts. The cell would deliver 10 ma. at 1.5 volts. Excessive gassing of the Mg anode had a pronounced effect on the cell performance. No corrosive inhibitor was used.

Example III

Using the experiment and techniques described in Example II, except the electrolyte had a concentration of 250 g./liter of $MgBr_2 \cdot 6H_2O$, the primary cell had an open circuit voltage of 1.95 volts. The cell voltage decayed from 1.45 volts to 9.95 volt in 310 minutes at a discharge rate of 0.030 amp./g. This represents a capacity of 9.3 amp. min./g.

Example IV

Using the experiment and techniques described in Example II, with an electrolyte of 500 g./liter of $MgBr_2 \cdot 6H_2O$ and 1 g./liter of lithium chromate ($Li_2CrO_4 \cdot 2H_2O$), the primary cell had an open circuit voltage of 1.84 volts. The cell voltage decayed from 1.71 volts to 0.56 volt in 520 minutes at a discharge rate of 0.030 amp./g. This represents a capacity of 16.65 amp. min./g. The lithium chromate was added to the electrolyte to inhibit self-discharge of the magnesium anode.

Example V

Using the cell of Example II with a cathode mix consisting of 0.5 g. of 1,4-bis(dicyanomethylene)-2,5-cyclohexadiene and 0.25 g. of acetylene carbon black, a capacity of 18.0 amp. min./g. was determined when discharged at a rate of 0.030 amp./g.

Example VI

In an experiment similar to Example V, the cell was discharged at a rate of 0.060 amp./g. The cell voltage decayed from 1.50 volts to 0.75 volt in 240 minutes which represents a capacity of 12.2 amp. min./g.

Example VII

Using the techniques of Example II with a cathode mix consisting of 0.5 g. of 1,4-bis(dicyanomethylene)-2,5-cyclohexadiene and 0.25 g. of acetylene carbon black, the cell was discharged at 0.100 amp./g. The cell had an open circuit voltage of 1.87 volts when magnesium was used as the anode and the electrolyte consisted of a 500 g./liter of $MgBr_2 \cdot 6H_2O$ and 1 g./liter of $Li_2CrO_4 \cdot 2H_2O$ solution. The cell voltage decayed from 1.4 volts to 0.75 volt in 65 minutes.

As is well known to the battery art, cells can be constructed in different forms. Thus, units of cells containing the depolarizer of this invention can be used in series to provide higher voltages if required.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A primary voltaic cell containing as a cathode depolarizer at least one polycyanoethylenic compound, said compound containing at least two cyano groups directly attached to ethylenic carbon.

2. A primary voltaic cell containing as a cathode depolarizer at least one polycyanoethylenic compound, said compound containing at least two cyano groups directly attached to ethylenic carbon, said compound being further characterized by being stable in the presence of aqueous inorganic salt electrolytes, by having a molecular weight below about 200, and by having at least one pair of ethylenic carbon atoms per molecule.

3. The primary voltaic cell of claim 2 containing an aqueous inorganic salt electrolyte.

4. A primary voltaic cell containing 1,4-bis(dicyanomethylene)-2,5-cyclohexadiene as a cathode depolarizer.

5. A primary voltaic cell containing tetracyanoethylene as a cathode depolarizer.

6. A paste for use in a voltaic cell comprising (1) a polycyanoethylenic compound having a molecular weight below about 200, said polyethylenic compound further having at least two cyano groups directly attached to ethylenic carbon and at least one pair of ethylenic carbon atoms per molecule, and (2) graphite, said paste being compounded with aqueous silver nitrate.

7. The paste of claim 6 wherein the polycyanoethylenic compound is 1,4-bis(dicyanomethylene)-2,5 - cyclohexadiene.

References Cited in the file of this patent

UNITED STATES PATENTS 2,880,122      Morehouse et al.      Mar. 31, 1959